June 5, 1951   L. M. BALL   2,556,132
STRAIN GAUGE
Filed Oct. 28, 1948

INVENTOR
Laurence M. Ball
BY
Harness and Harris
ATTORNEYS.

Patented June 5, 1951

2,556,132

UNITED STATES PATENT OFFICE 2,556,132

STRAIN GAUGE

Laurence M. Ball, Birmingham, Mich., assignor to Chrysler Corporation, Highland Park, Mich., a corporation of Delaware Application October 28, 1948, Serial No. 57,079

1 Claim. (Cl. 201—63)

My invention relates to improved gauges.

More particularly my invention relates to an improved type of strain gauge and the method of making the same.

A principal object of my invention is to provide a strain gauge of the type having a greater sensitivity relative to the conventional types of strain gauges known to the art.

Another object of my invention is to provide an improved strain gauge of the electrical resistance type capable of very accurate measurements due to its physical and dimensional characteristics.

A further object of my invention is to provide an improved method of making strain gauges.

Other objects and advantages will become more apparent from the following description of my invention, reference being had to the accompanying drawings in which.

Figures 1, 2, 3:
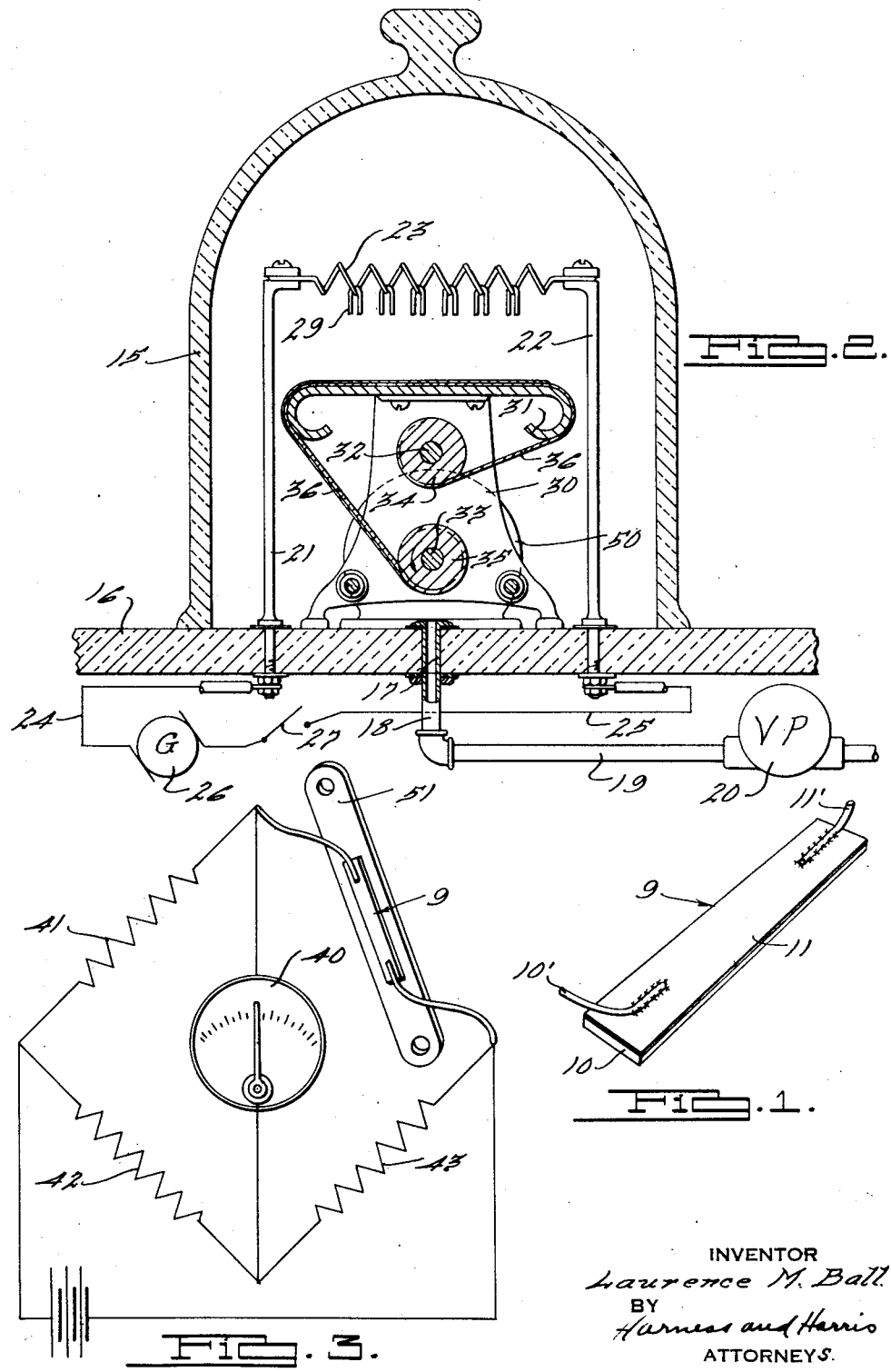
Fig. 1 is a perspective view of my improved strain gauge.
Fig. 2 is an elevational view partly in section of apparatus employed in the method of making my improved strain gauge.
Fig. 3 is a schematic view of a conventional electrical circuit illustrating an application of my improved strain gauge.

In Fig. 1, I have shown my improved strain gauge generally indicated by the numeral 9, which comprises a rectangular segment 10 of backing material having a film 11 of a vapor condensate disposed thereon. The gauge 9 is provided with connecting wires 10' and 11' which are soldered or in any suitable manner secured to the film 11 at locations on the opposite extremities of the rectangular segment 10.

The film 11 may be disposed on the backing material by the method hereinafter described. In the practice of this method the backing material is preferably employed in the form of a long continuous strip rolled on a drum. Cut lengths of the backing material may be used if desired. After the condensate has been disposed on the backing material, it may be conveniently cut to a predetermined size, such as the size shown in Fig. 1. The size of the segment 10 is not critical but depends upon the dimensions required by the contemplated use of the gauge.

The backing material may be of any suitable type of non-metallic, electrical insulating substance which is susceptible to predetermined stretching while the condensate which forms the film 11 may be any suitable type of alloy which will vaporize and thereafter deposit as a film 11 on the backing material 10.

The composition of the backing material may vary somewhat widely. It may comprise non-metallic insulating material sufficiently capable of stretching to transfer elongation from the specimen to be tested to the film 11. Materials such as paper-like fibers, yieldable resinous sheet material, cigarette paper, onion skin paper and vellum would be very satisfactory as backing material.

The following types of alloys have been found to be very satisfactory for this purpose: an alloy containing 61% nickel, 23% iron, and 16% chromium; an alloy containing 55% copper and 45% nickel; and an alloy containing .4 to .8% magnesium, .5 to 1.5% molybdenum, 36% nickel, 8% chromium, and 54% iron. It should be understood that the proportions as well as metals given are only illustrative and can be varied in accordance with the alloy desired.

In Fig. 2, I have shown structure to be used to deposit a suitable alloy upon the backing material in a continuous and commercially acceptable manner. This apparatus includes a bell jar 15 which rests upon a glass base 16. The base 16 is provided with an aperture 17 which receives a conduit 18 which is connected through appropriate conduits such as 19 to a vacuum pump 20. The vacuum pump 20 is employed to greatly reduce the air content and pressure within the bell jar 15 so that my improved method of disposing the alloy in the form of the vapor condensate on the backing material may be done in an evacuated atmosphere. Terminal rods 21 and 22 are disposed within the bell jar 15 and are secured at their lower ends to the glass base 16 and are electrically connected at their upper ends by a spirally wound resistance coil 23. The lower extremities of the rods 21 and 22 extend through holes 21' and 22', respectively, in the glass base 16 and are provided with washers 23' and 24' which seal the outer edge portions of the holes 21' and 22' to prevent influx of air into the jar 15 after it has been evacuated. The lowermost tips of the rods 21 and 22 are connected through appropriate wire conductors 24 and 25 to a source of electrical energy such as a generator 26 so that when switch 27 is closed electric current will flow through the rods 21 and 22 as well as the resistance coil 23. The resistance coil 23 may be any conventional type of resistance coil which, when heated, reaches a predetermined high temperature due to its high electrical resistance. The coil 23 is provided with small U-shaped pieces 29 of an alloy as heretofore described which are disposed on and supported by adjacent loops of the coil 23. By this construction the pieces 29 are similarly heated when electrical energy causes the coil 23 to reach a high temperature. By heating the alloy pieces 29 in this manner within an evacuated atmosphere a vapor comprising the molecules of the alloy is emitted.

A stand 30 is disposed within the jar 15 directly beneath the coil 23 and is provided with a platform 31 at its upper extremity at a predetermined distance from the coil. The stand 30 is also provided with rollers 32 and 33 which receive drums 34 and 35, respectively, of backing material 36. The backing material may be conveniently rolled in the form of the drum 34, placed around the roller 32, disposed over the platform 31, and wound around the roller 33 in the form of the drum 35. By suitable driving mechanism, the roller 33 may be rotated in a counterclockwise direction causing backing material 36 to be pulled off the drum 34 over the platform 31 and on to the drum 35. This driving mechanism may comprise an electric or spring motor 50 entirely contained in the bell jar 15. If an electric motor is employed, current may be supplied thereto from the terminal bars 21 and 22. The speed of the backing material over the platform 31 may be predetermined in accordance with the distance of the platform 31 from the alloy pieces 29 and in accordance with the thickness of the vaporized condensate of the alloy desired. The distance of the platform 31 from the alloy pieces 29 is not critical although it has been found most desirable that the distance from the backing to the alloy during vaporization of the alloy should be less than the mean free path of the molecules of the alloy. This is desirable because at any greater distance than the mean free path, the molecules of the alloy would strike the molecules of the residual gases left within the bell jar 15 after it has been evacuated.

It has also been determined that a pressure within the bell jar of approximately ten to the minus fourth power millimeters of mercury is necessary to satisfactorily deposit the alloy on the backing material. This pressure may be varied however in accordance with the distance of the backing material from the resistance coil. It should be taken into consideration however, that if less pressure is used and the backing material is placed closer to the resistance coil, the temperature required to vaporize the alloy will be greater thus causing possible injury to the backing material.

By employing a vaporization process of this type in the formation of the film 11, a very small thickness of the film may be obtained without employing excessive temperatures which would injure the backing material. If desired a thickness of approximately only one molecule of the alloy may be obtained. Since the sensitivity of the gauge is proportionate to its thickness, a much greater sensitivity may be obtained from my improved strain gauge in comparison to others well known in the art. By using a film of desired thickness, the sensitivity of the strain gauge may be predetermined in accordance with its contemplated use.

Therefore, in accordance with my invention, no bonding of the film 11 to the segment 10 is required since the film is deposited and secured in situ on the segment. As a result, the sensitivity of the gauge as well as the uniformity of calibration is greatly enhanced.

In Fig. 3, for purposes of illustration, I have shown a conventional electrical system used in conjunction with a strain gauge. A meter 40 such as galvanometer together with the resistors 41, 42, and 43, the strain gauge 9 and a battery 44 form the electrical system known as a Wheatstone bridge. The side of the segment 10 opposite from the film 11 is preferably cemented to the specimen 51, to be tested.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

A strain gauge comprising an electrically non-conductive backing layer, and a strain sensitive electrically conductive metallic layer comprising a metallic vapor condensate of approximately 55 per cent copper and 45 per cent nickel.

LAURENCE M. BALL.

REFERENCES CITED

The following references are of record in the file of this patent:

UNITED STATES PATENTS

| Number | Name | Date |
| --- | --- | --- |
| 2,074,281 | Sommer | Mar. 16, 1937 |
| 2,079,784 | Williams | May 11, 1937 |
| 2,139,640 | Mall et al. | Dec. 6, 1938 |
| 2,384,500 | Stoll | Sept. 11, 1945 |
| 2,438,205 | Coates | Mar. 23, 1948 |

FOREIGN PATENTS

| Number | Country | Date |
| --- | --- | --- |
| 342,300 | Great Britain | Jan. 28, 1931 |
| 517,586 | France | Dec. 20, 1920 |